(12) United States Patent
Lindstad

(10) Patent No.: US 6,530,970 B2
(45) Date of Patent: Mar. 11, 2003

(54) METHOD FOR RECOVERING ALUMINUM VAPOR AND ALUMINUM SUBOXIDE FROM OFF-GASES DURING PRODUCTION OF ALUMINUM BY CARBOTHERMIC REDUCTION OF ALUMINA

(75) Inventor: Tor Lindstad, Trondheim (NO)

(73) Assignees: Alcoa Inc., Pittsburgh, PA (US); Elkem ASA, Oslo (NO)

( * ) Notice: Subject to any disclaimer, the term of this patent is extended or adjusted under 35 U.S.C. 154(b) by 103 days.

(21) Appl. No.: 09/862,196

(22) Filed: May 21, 2001

(65) Prior Publication Data
US 2002/0170387 A1 Nov. 21, 2002

(51) Int. Cl.⁷ ................................................ C22B 21/02
(52) U.S. Cl. ...................... 75/10.27; 75/10.36; 75/674; 423/439; 423/247
(58) Field of Search .................. 75/674, 10.27, 75/10.36; 423/439, 247

(56) References Cited

U.S. PATENT DOCUMENTS 3,811,916 A * 5/1974 Russell et al. .............. 427/213
4,099,959 A   7/1978 Dewing et al.
4,261,736 A * 4/1981 Dewing et al. ................ 75/674

FOREIGN PATENT DOCUMENTS

CA  1185435  4/1985 .................. 53/243
DE  696392  9/1940

OTHER PUBLICATIONS

Kai Hohansen et al., *Carbothermic Aluminum, Sixth International Conference on Molten Slags, Fluxes and Salts*, Jun. 12–17, 2000.

* cited by examiner

Primary Examiner—Stuart L. Hendrickson
Assistant Examiner—Peter J Lish
(74) Attorney, Agent, or Firm—Daniel P. Cillo; Glenn E. Klepac

(57) ABSTRACT

A method for aluminum recovery during the carbothermic production of aluminum in a smelting furnace (1,2) is disclosed, where during carbothermic reduction of alumina, aluminum and aluminum suboxide vapors are produced (3, 4), which are reacting with carbon. Reactive carbon is generated in situ by the cracking of hydrocarbon compounds (6) in a separate closed reactor vessel (5) at a temperature greater than about 1955° C. Solid aluminum carbide that formed during the reaction can then be recycled by a conduit (8) to the primary reactor for reduction to aluminum, and reactor gas (10) can be fed to a cooler (9).

14 Claims, 1 Drawing Sheet

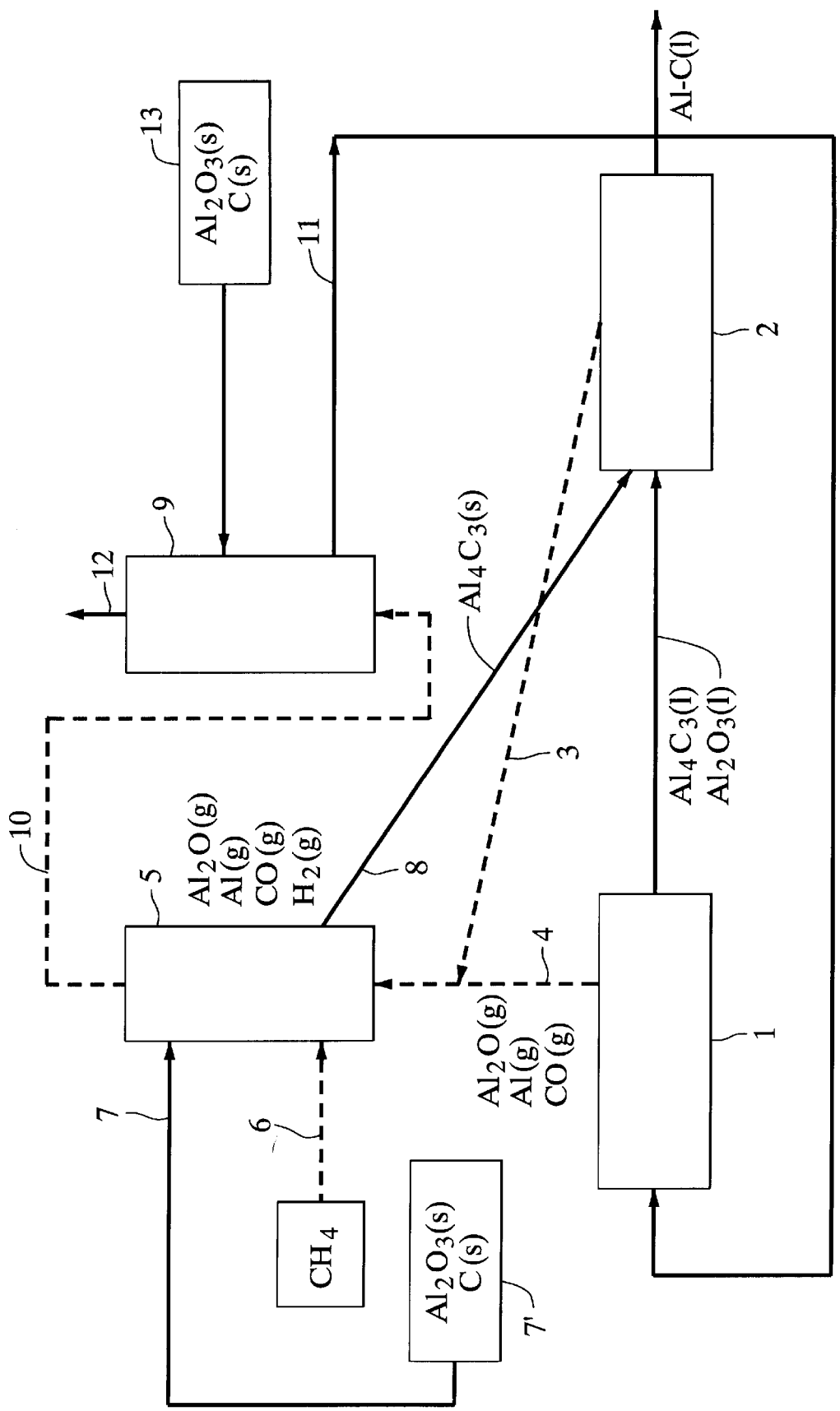

METHOD FOR RECOVERING ALUMINUM VAPOR AND ALUMINUM SUBOXIDE FROM OFF-GASES DURING PRODUCTION OF ALUMINUM BY CARBOTHERMIC REDUCTION OF ALUMINA

FIELD OF THE INVENTION

The present invention relates to a method for recovering Al vapor and $Al_2O$ from off gases generated during the production of aluminum by carbothermic reduction of alumina.

BACKGROUND OF THE INVENTION

Carbothermic reduction of alumina with carbon is highly endothermic and requires temperatures in excess of 2050° C. for the production of aluminum. The production of aluminum at these high temperatures is accompanied by evolution of CO and substantial amounts of Al vapor and $Al_2O$. The Al components in the off-gas back-react exothermically with the evolved carbon monoxide as the gas temperature is lowered. Such back-reaction is highly exothermic and represents a very large potential loss of energy. Furthermore it gives rise to the formation of deposits of aluminum oxycarbide, which are sticky and tend to block up off-gas conduits.

In U.S. Pat No. 4,099,959 (Dewing et al.), it has been proposed to avoid these difficulties by reacting the Al vapor and the $Al_2O$ in the off-gas with carbon to form a non-sticky $Al_4C_3$ with simultaneous generation of heat energy for preheating the carbon feed. This is achieved by passing the off-gas through a bed of relatively large pieces of carbon which are essentially stationary in relation to each other. In such a system there is, however, a risk of accidental formation of aluminum oxycarbide which will cause cementing of the lumps of carbon to one another.

In U.S. Pat. No. 4,261,736 (Dewing et al.), these problems are addressed by contacting the off-gas containing Al vapor and $Al_2O$ with particulate carbon in a fluidized bed maintained at a temperature above the temperature at which sticky aluminum oxycarbide forms and where heated carbon enriched with $Al_4C_3$ is removed from the fluidized bed. When using carbon particles as taught in the '736 patent the surface of each carbon particle will become covered by reaction products and the reaction rate will thus be reduced as the gas must penetrate the reaction product layer on each carbon particle in order to continue the reaction. Only a part of the carbon in the carbon particles will thus be reacted to $Al_4C_3$. Consequently, the consumption of carbon particles in the process of U.S. Pat. No. 4,261,736 will be very high and the efficiency of the reaction low.

SUMMARY OF THE INVENTION

The present invention relates to a method for recovering Al components from the off-gas produced during the carbothermic production of aluminum, where the off-gas comprises CO, Al vapor and aluminum suboxide. It will be appreciated that aluminum suboxide is typically referred to as $Al_2O$, but that the ratio of aluminum to oxygen varies over a broad range; the term aluminum suboxide as used herein is intended to encompass $Al_2O$ and compounds having aluminum to oxygen ratios other than 2:1. According to the present method, the off-gas is supplied to an enclosed reactor kept at a temperature of more than 1950° C. A continuous supply of one or more gaseous or liquid hydrocarbon compounds, such as $CH_3$ shown in the FIGURE, are provided to the enclosed reactor.

The compounds generally have the formula $C_nH_m$ where n is a number from 1 to 12 and m is a number from 2 to 26. Preferably, the formula will be $C_nH_{2n+2}$, as for example $CH_4$, or $C_2H_6$, and includes naphtha, gasoline and fuel oil. The hydrocarbons crack to form finely dispersed solid carbon and hydrogen gas in the enclosed reactor. This carbon has a very small particle size, from about 20 micrometers to about 500 micrometers and a very high surface area, from about 1 $m^2/g$ to about 10 $m^2/g$. The carbon thus produced then reacts with the Al-components in the off-gas to produce $Al_4C_3$. The present Al vapor/$Al_2O$ recovery methods provide for a fast reaction between carbon and the Al containing compounds in the off-gases; the invention further provides a method wherein the temperature in the reaction zone can be easily kept above the critical temperature at which aluminum oxycarbide will form. Moreover, the use of cracked hydrocarbons reduces the temperature at which aluminum carbide is formed.

According to a preferred embodiment methane; ethane; propane; butane, that is $C_4H_{10}$; acetylene, that is $C_2H_2$; ethylene, that is $C_2H_4$; propylene, that is $C_3H_6$; butylene, that is $C_4H_8$; or a mixture of two or more of these gases are used. Thus triple bonded and double bonded hydrocarbons are useful. Decomposition of triple bonded and double bonded hydrocarbons give finely dispersed carbon black. It is not known if they will perform any better than saturated hydrocarbons. Preferred liquid compounds include naphtha, gasoline and fuel oil. Thus, both aliphatic and aromatic hydrocarbons can be used; aliphatic hydrocarbons can be saturated or unsaturated. It is within the scope of the invention to use mixtures containing both liquid and gaseous hydrocarbons.

In a preferred embodiment, seed particles are added to the enclosed reactor. The finely dispersed carbon formed by cracking of the hydrocarbon compounds will be deposited, at least partly, on the surface of the seed particles. This provides a large surface area of carbon which is available for reaction with the Al components of the gas. The seed particles may be any inert particles such as $Al_2O_3$, carbonaceous particles, aluminum carbide particles or a mixture of such particles. The preferred particle size for the seed particles fed should be as small as practically possible, and will thus depend on the reactor configuration. With a fluidized bed they might be about 100 micrometer, whereas in a moving bed they might be 1 millimeter.

The present invention provides for the substantially continuous production of finely dispersed carbon in-situ in the enclosed reactor or other enclosed space, as the hydrocarbon enters the reactor and is subjected to the environment maintained therein. Fresh reactive carbon will thus be readily available for reaction with the Al components in the gas. This in-situ produced carbon is very reactive, and, as noted above, will at least partly deposit on the surface of the seed particles and will react very fast with the Al vapor and $Al_2O$ in the off-gas. Al vapor and $Al_2O$ are sometimes collectively referred to herein as "Al-containing compounds" or "Al components".

Since the cracking reaction of the hydrocarbon compounds is endothermic, the temperature in the enclosed reactor can be closely controlled by regulating the amount of hydrocarbon compounds supplied to the enclosed reactor. This is done by measuring and controlling the flow of hydrocarbons, for example, for a liquid hydrocarbon a mass flowmeter could be used and for a gaseous hydrocarbon, an orifice could be used.

The method of the present invention can be carried out in any reactor suited for gas/solid reaction such as fluidized bed reactors, spouted beds, moving beds, rotary kilns and columns filled with seed particles. One skilled in the art will appreciate that these reactors are widely commercially available. The term "enclosed reactor" encompasses any of these reactors.

If columns filled with seed particles are used, it is preferred that the seed particles be carbonaceous or a mixture of carbon and alumina particles. The hydrocarbon compounds are preferably supplied to the lower part of the column and most preferably the hydrocarbon compounds are supplied to more than one level of the column to ensure that carbon is produced in the whole volume of the column. The seed particles on which $Al_4C_3$ is deposited can be withdrawn from the bottom part of the column and fresh seed particles can be supplied at the top of the column.

As stated above, finely dispersed carbon and hydrogen gas are formed when the hydrocarbon compounds crack in the enclosed space. The hydrogen gas formed will dilute the gas phase and will reduce the temperature at which aluminum carbide will form from about 2010° C. to about 1950° C. The method of the present invention is therefore carried out at a lower temperature than art-reported methods. This will reduce the heat stress on the material in the enclosed space and make the process more easy to run. Further, it has been found that the temperature range wherein sticky aluminum oxycarbide is formed is more narrow when gaseous or liquid hydrocarbon compounds are used as the carbon source, thereby providing another advantage of the present methods. For example, when using methane as the hydrocarbon compound it has been found that the temperature range where aluminum oxycarbide is formed is between 1940° C. and 1955° C., which is favorable, compared to a calculated temperature range between 1970° C. and 2020° C. for the art reported methods. Accordingly, the formation of aluminum oxycarbide in the present methods will occur at much lower temperatures than in art-reported methods. In the method of this invention, the temperature in the enclosed reactor will be over 1955° C., preferably from 1955° C. to 2000° C.

The hydrogen produced in the enclosed reactor by cracking of hydrocarbon compounds will not react with the Al compounds to any substantial degree. In addition, the hydrogen will add to the calorific value of the gas leaving the enclosed reactor. The heat energy can be recovered from the gas leaving the enclosed reactor by combustion of the gas to produce steam, which can be used to produce electric energy in a generator. The solid material discharged from the enclosed reactor, which at least partly consists of $Al_4C_3$, is recycled to the carbothermic smelting furnace.

The reactor gas from the enclosed reactor, containing CO, $H_2$ and some unreacted Al vapor and $Al_2O$, is subjected to rapid cooling, preferably by mixing the gas with carbon and $Al_2O_3$ in a separate vessel. The carbon and $Al_2O_3$ is thereby preheated while Al vapor and $Al_2O$ are converted to carbon and $Al_2O_3$; minor amounts of aluminum oxycarbide are also produced. The preheated carbon and $Al_2O_3$ containing some aluminum oxycarbide are used as a raw material feed to the carbothermic reduction furnace.

The CO and $H_2$ remaining in the gas has a high energy content and can be used to produce steam, which can in turn be used to produce electric energy in a generator.

BRIEF DESCRIPTION OF THE DRAWINGS

The FIGURE is a flow-sheet showing an example of a complete system for the treatment of off-gas from a carbothermic reduction furnace for the production of aluminum in accordance with an embodiment of the present invention.

DETAILED DESCRIPTION OF PREFERRED EMBODIMENTS

The FIGURE illustrates one embodiment for carrying out the present invention. It will be appreciated that the FIGURE merely represents one embodiment of the invention and that numerous variations, as discussed above, are within the present scope. In the FIGURE, gas flows are shown as dashed lines and flows of solids and molten substances are shown as solid lines.

In the FIGURE the off-gas from a carbothermic smelting furnace comprising a first stage 1 and a second stage 2 is forwarded via conduits 3 and 4 to an enclosed reactor, for example, a fluidized bed reactor 5. Methane 6, one possible hydrocarbon compound, is supplied to the fluidized bed at reactor 5 and seed particles are supplied to the fluidized bed reactor at 7 near the top of reactor 5. The seed particles 7' can be any of those stored in a suitable container as shown. The methane cracks in the reactor 5, which is maintained at an elevated temperature of greater than 1955° C., most preferably from about 1970° C. to 2000° C., and forms finely dispersed carbon which at least partly deposits on the seed particles. The Al-components of the off-gas entering the fluidized bed react with the carbon to form $Al_4C_3$. The $Al_4C_3$ is removed from the fluidized bed reactor and forwarded to stage 2 of the carbothermic furnace through a conduit 8.

The reactor gas from the fluidized bed, which contains CO and unreacted Al and $Al_2O$ together with the $H_2$ formed during cracking of methane, is forwarded via conduit 10 to a cooling reactor 9 where the gas is rapidly cooled by mixing with $Al_2O_3$ and carbonaceous material stored in container 13. During cooling of the gas in the cooling reactor 9, the remaining Al-components in the gas form some aluminum oxycarbide, $Al_2O_3$ and carbon. $Al_2O_3$, carbon and aluminum oxycarbide, which have been preheated and discharged from the cooling reactor 9, are forwarded as a raw material to stage 1 of the carbothermic smelting furnace via conduit 11.

The cooled gas 12, from the cooling reactor 9, consisting of CO and $H_2$ has a high calorific value and can be forwarded to a boiler which produces steam for use, for example, in a generator for producing electric energy; the gas can also be used as a synthesis gas.

Whereas particular embodiments of this invention have been described above for purposes of illustration, it will be evident to those skilled in the art that numerous variations of the details of the present invention may be made without departing from the invention as defined in the appended claims.

Having described the presently preferred embodiments, it is to be understood that the invention may be otherwise embodied within the scope of the appended claims.

What is claimed is:

1. A method for recovering Al components from an off-gas produced during carbothermic production of aluminum, where the off-gas comprises CO, Al vapor and aluminum suboxide comprising:

a) directing said off-gas to an enclosed reactor kept at an elevated temperature; and b) supplying to the enclosed reactor one or more gaseous or liquid hydrocarbon compounds that will form solid carbon and hydrogen gas upon heating;

wherein the hydrocarbon compounds crack to form carbon and hydrogen in the enclosed space and the carbon formed reacts with the Al and aluminum suboxide in the off-gas to produce $Al_4C_3$.

2. The method according to claim 1, wherein seed particles are supplied to the enclosed space, and the hydrocarbon compounds are selected from the group consisting of CnHm where n is 1 to 12 and m is 2 to 26, naphtha, fuel oil, gasoline, and mixtures thereof.

3. The method according to claim 2, wherein the one or more gaseous hydrocarbon compounds are selected from the group methane, ethane, ethylene, acetylene, propane, propylene, butane, butylene and isobutane.

4. The method according to claim 2, wherein the one or more liquid hydrocarbon compounds are selected from the group naphtha, fuel oil and gasoline.

5. The method according to claim 2, wherein the seed particles are carbon-containing particles.

6. The method according to claim 2, wherein the seed particles are $Al_2O_3$.

7. The method according to claim 2, wherein the seed particles are a mixture of carbon-containing particles and $Al_2O_3$ particles.

8. The method according to claim 1, wherein the enclosed reactor is a fluidized bed reactor.

9. The method according to claim 1, wherein the enclosed reactor is a column with counter current flow of seed particles and off-gas.

10. The method according to claim 1, wherein the temperature of the enclosed reactor is greater than 1955° C.

11. The method of claim 1, wherein the step of reacting said carbon with said aluminum vapor and aluminum suboxide is performed at a lower temperature than when said vapor and suboxide are reacted with carbon particles not formed in the reactor by cracking hydrocarbons.

12. The method of claim 1, wherein the carbon formed has a particle size ranging from about 20 micrometers to about 500 micrometers and a surface area from about 1 $m^2$/gm to about 10 $m^2$/gm, and where the temperature of the enclosed reactor is from 1955° C. to 2000° C.

13. In a method for producing aluminum by carbothermic reduction of alumina wherein said carbothermic reduction yields an off-gas comprising carbon monoxide, aluminum vapor, and aluminum suboxide, said off-gas being directed to a reactor maintained at an elevated temperature, the improvement wherein for the purpose of reducing the reactor temperature, a gaseous or liquid hydrocarbon is supplied to the reactor, said hydrocarbon is cracked in the reactor to form carbon, and said carbon is reacted with the aluminum vapor and aluminum suboxide to form aluminum carbide.

14. The method of claim 13, wherein the carbon formed has a particle size ranging from about 20 micrometers to about 500 micrometers and a surface area from about 1 $m^2$/gm to about 10 $m^2$/gm.

* * * * *

UNITED STATES PATENT AND TRADEMARK OFFICE
CERTIFICATE OF CORRECTION

PATENT NO.    : 6,530,970 B2
DATED         : March 11, 2003
INVENTOR(S)   : Tor Linstad It is certified that error appears in the above-identified patent and that said Letters Patent is hereby corrected as shown below:

<u>Column 1,</u>
Lines 1-4, please insert the following:

-- Statement Regarding Federally Funded Research

The subject matter of this application was made with United States Government support under Contract No. DE-FC07-001D13900 awarded by the Department of Energy. The United States Government has certain rights to this invention. --

Signed and Sealed this

Tenth Day of June, 2003

JAMES E. ROGAN
*Director of the United States Patent and Trademark Office*